Patented Oct. 10, 1933

1,929,829

UNITED STATES PATENT OFFICE 1,929,829

DOUGHNUT MIX

Alva J. Shroyer, Indianapolis, Ind., assignor to The James A. Harper Supply Company, Kansas City, Mo., a corporation of Missouri No Drawing. Application April 19, 1930
Serial No. 445,826

2 Claims. (Cl. 99—11)

My invention relates to doughnuts and like food products produced by processes including fermentation, and to processes for manufacturing doughnuts.

Two types of doughnuts have been produced in common practice. One type is produced by employing yeast to raise the dough, and is known to the trade as yeast doughnut, while the other type has the texture and general character of cake, baking powder or like chemical means being employed for raising the dough, and is known as a cake doughnut. Each type of doughnut dough may be provided with flavoring and other accessory ingredients suitable to its use and compatible with other ingredients in the specific type, but doughnuts produced by the two conventional methods are easily distinguished, each therefore lacks one or more of the qualities of the other, and customers preferring one will not be satisfied by the other. The peculiar character of each type of doughnut is intensified as the doughnuts dry out.

My invention therefore has for its principal objects to combine the desirable characteristics of yeast and baking powder doughnuts, to produce doughnuts in which bread-like normal character is modified, to combine ingredients of diverse types of doughnuts in such proportions that different leavening agents will cooperate to produce a dough having relatively large volume and better texture than practicable with either agent used alone, and to provide a process for manufacturing doughnuts whereby chemical agents and ingredients may cooperate with yeast to produce a doughnut having novel texture and flavors and relatively large volume proportionate to the amounts of materials used.

A further object of my invention is to limit the absorption by doughnuts of grease in which they may be fried.

In one aspect, my invention consists in adding to a dough batch including one type of leavening agent, another type of levening agent, for example, adding to a dough batch containing yeast, a supplementary ingredient including a baking powder.

In another aspect, my invention consists in incorporating an acetic acid constituent, for example vinegar, in a batch of dough containing yeast as the fermenting agent.

In another aspect, my invention consists in including one or more acid salts of sodium in the supplementary ingredient above referred to for addition to a dough batch containing yeast and also preferably containing a harmless natural mixture containing acetic acid as a chief constituent.

A complete formula for doughnut dough including flavoring material and like accessory ingredients, and representing one composition that may be produced by employing my invention, will be given, quantities being mentioned to indicate the preferred proportions of the several ingredients whereby satisfactory results may be obtained:

| | |
|---|---|
| Water | 4½ qts. |
| Sugar | 2½ lbs. |
| Shortening | 2½ lbs. |
| Eggs | 8 |
| Vinegar | ⅛ pt. |
| Mace cake flavor | 1 oz. |
| Yeast | 2 lbs. |
| Vanilla | 3 oz. |
| Milk powder | ½ lb. |
| Flour | 18 lbs. |
| Salt | 4 oz. |

Supplemental ingredient including sodium carbonate .415 ounce, sodium acid pyrophosphate .415 ounce.

The supplemental ingredient above referred to preferably comprises a so-called cake powder adapted to be added to a dough batch to effect raising or lightening of the dough, and including, in approximately 8 ounces of the powder, the following ingredients in substantially the proportions given:

| | |
|---|---|
| Starch | 6.815 oz. |
| Sodium acid pyrophosphate | 0.415 oz. |
| Sodium carbonate | 0.415 oz. |
| Sodium chloride (salt) | 0.267 oz. |
| Oil of mace | 2 drops |
| Oil of lemon | 5 drops |
| Concentrated butter flavor | 4 drops |

The vinegar above specified is preferably included in the yeast dough batch, to confer a distinctive flavor on the doughnuts, and to cooperate with the leavening agents and products for enhancing the action thereof, though its omission will not prevent the desirable action of the fermenting agents.

While I am not able to explain in detail the reactions occurring in the dough due to the presence of yeast, vinegar, sodium acid pyrophosphate, and sodium carbonate, I believe that the yeast and other dough-lightening ingredients cooperate in a manner to produce a lighter dough than could be produced by either alone, and that it is possible to include vinegar because of the inclusion of the sodium elements.

A particular service of the vinegar, however, is to act as a grease-repellant, to prevent absorption by the doughnuts of excessive amounts of the grease in which they may be fried.

In preparing a batch of dough for making doughnuts having the above described ingredients, I prefer to follow steps which will now be described, whereby the several ingredients will be enabled to perform their functions most satisfactorily.

A liquid mixture is first prepared, including the yeast, and comprising for example 4½ quarts of water, 2½ pounds of sugar, 2½ pounds of shortening such as lard, 8 eggs, 1 ounce of flavoring such as mace cake including corn flour and oil of mace, two pounds of yeast such as commercial compressed yeast, and three ounces of flavoring such as vanilla. When vinegar is to be included, one-fifth pint of vinegar is added to the liquid mixture.

The dry ingredients are then sifted and thoroughly mixed together in amounts proportionate to the quantities of materials in the liquid mixture, to form a dry mixture, including for example 18 pounds of wheat flour, one-half pound of milk powder, 4 ounces of salt, and 8 ounces of a cake powder including preferably equal parts, for example .415 ounce each of sodium acid pyrophosphate and sodium bicarbonate.

The dry mixture is then added to the liquid mixture and thoroughly mixed therewith to form a doughnut dough batch or mix, having the stiffness of so-called roll dough.

The mixed dough is let set for approximately one hour, and not less than 50 minutes, then divided into small pieces, and permitted to raise for five minutes. The pieces are then rolled to desirable thickness, and cut into suitable portions for doughnuts.

The portions are permitted to raise as for ordinary yeast doughnuts, and then fried at 375° F.

The resulting doughnuts are relatively flexible and elastic in the mass, and thus resemble yeast doughnuts, but may be broken easily. The texture is close and more nearly resembles that of cake, due to the actions of gases consequent on the thorough distribution of sodium and acid elements through the dough batch and cooperation of said elements with the fermentation resulting from the action of the yeast.

The doughnuts will contain substantially a predetermined proportion of fats such as shortening and grease, since the vinegar will tend to repel the grease in which the doughnuts are fried.

A larger proportion of shortening may therefore be included in the dough without incurring hazard of producing doughnuts having excessive proportions of fats including the shortening and greases absorbed during the frying process. Doughnuts having more of cake character may therefore be produced, since the amounts of fats can be controlled by use of vinegar.

What I claim and desire to secure by Letters Patent is:

1. The process of making doughnuts including adding vinegar to doughnut dough adapted to be fried in grease to repel the grease.

2. The process of making doughnuts comprising preparing a liquid mixture including yeast, water, sugar and shortening, adding vinegar to the mixture to act as a repellant to grease wherein the doughnuts are fried, preparing a dry mixture including flour, milk powder, salt, cake powder and substantially equal parts of sodium acid pyrophosphate and sodium bicarbonate, admixing the dry with the liquid mixture to form a batch, permitting the batch to set for approximately one hour, subdividing the batch, and permitting the subdivided portions to raise.

ALVA J. SHROYER.